United States Patent [19]

Maier

[11] 4,101,367
[45] Jul. 18, 1978

[54] SINGLE FACE CORRUGATING MACHINE

[75] Inventor: Johann Maier, Weiden, Opf., Fed. Rep. of Germany

[73] Assignee: BHS-Bayerische Berg-,Hutten-und Salzerke Aktiengesellschaft, Fed. Rep. of Germany

[21] Appl. No.: 778,106

[22] Filed: Mar. 16, 1977

[30] Foreign Application Priority Data

Mar. 17, 1976 [DE] Fed. Rep. of Germany ....... 2611325

[51] Int. Cl.² .............................................. B31F 1/28
[52] U.S. Cl. .................................. 156/471; 156/472; 156/582
[58] Field of Search ............... 156/205, 206, 210, 462, 156/470, 471, 472, 473, 582

[56] References Cited

U.S. PATENT DOCUMENTS

| 3,053,309 | 9/1962 | Wilson et al. | 156/471 |
| 3,527,638 | 9/1970 | Sonnichsen | 156/205 |
| 3,671,361 | 6/1972 | Morrison | 156/472 |
| 3,919,029 | 11/1975 | Osgood | 156/205 |

Primary Examiner—Caleb Weston
Attorney, Agent, or Firm—Silverman, Cass & Singer, Ltd.

[57] ABSTRACT

A single-face corrugating machine comprising two cooperating serrated rollers and a pressure roller cooperating with one of said serrated rollers. The tooth root contour of at least one serrated roller is designed as a concave curve; the corrugating impression from the machine takes place mainly when the central lines of the tooth tips and tooth roots coincide with the connection line of the roller axes. The toothing of the serrated rollers and the shape of the pressure roller is such that the respectively cooperating zones of tooth tip and tooth root are designed with a constant axial spacing of the respectively cooperating serrated rollers. At least two teeth are simultaneously in impression engagement over the entire length of engagement with constant axial spacing of one serrated roller with the pressure roller. The pressure roller comprises axially parallel longitudinal grooves whose contours are rolling curves of the tooth tip of the second serrated roller cooperating with said pressure roller.

17 Claims, 6 Drawing Figures

SINGLE FACE CORRUGATING MACHINE

BACKGROUND OF THE INVENTION

This invention relates to a single face corrugating machine comprising two co-operating serrated rollers and a pressure roller co-operating with the one serrated roller, each serrated roller having serration-type teeth with tooth tips and tooth roots, a paper web to be corrugated being fed between the two said serrated rollers under mutual pressure exerted thereon and a cover paper web being supplied to the web of the corrugated paper between the one serrated roller and said pressure roller.

In the single face corrugation machine, the corrugations are formed between two heated serrated rollers which rotate in opposite directions and which are pressed against one another along the pitch line. These serrated rollers are cylindrical rollers with serrations which are formed in the roller shell, which correspond to the desired shape of the corrugation of the paper to be corrugated, which are parallel to the axes of said rollers and which are of equal depth on both said rollers. The serration tips, i.e. the tips of the said serration-like teeth of each roller, press the paper against the serration trough, i.e. the serration roots of the respective mating roller, thereby imparting a permanent corrugation to it. The profile form of the serrated rollers corresponds to their task and the teeth of a serrated roller are thus fundamentally different from gear teeth.

In the case of gears, whose task is to transmit or convert a speed and torque, this transmission is accomplished in principle by the gears engaging on the contacting gear flanks. A considerable amount of clearance is provided in principle between the tooth tip and tooth root in order to prevent the gears from seizing. Circumferential forces are transmitted between adjacent tooth flanks by positive engagement.

In the case of serration-type teeth, however, whose task is to corrugate a web of paper or other material passing therethrough, there must not be any flank/paper web/flank contact. In order to obtain a stable paper corrugation, the serration-type teeth are pressed against the serration troughs under high linear pressures exerted on the interposed paper and, in addition, a considerable temperature is also used. The one serrated roller, which is not driven by an external means, is carried along, i.e. it is rotated by the serrated roller which is provided with a drive means. This occurs substantially by positive engagement across the paper which is pinched between the tooth tip and tooth root. A substantial torque transmission would not be possible with serration-type teeth and is not even required, since the only counter-torque which exists is the torque caused by the friction of the serrated roller mounting.

A comparison with normal gears shows that the laws for gear toothing which were developed for gears cannot be applied to serration-type teeth. Down to the present day, serration-type teeth are composed of circles and straight lines in accordance with the desired shape of the corrugated paper. The periodic variations in axial spacing between the centers of the two serrated rollers which occur in the rhythm of twice the tooth frequency are put up with because the rollers do not roll off each other perfectly and the variations are in the magnitude of a few hundredths of a millimeter. The serrated roller, which is lever-mounted and pressed against the other by hydraulic cylinders, yields by this amount and thus reduces and increases periodically the amount of sag accordingly.

The conditions in the glueing zone between the one serrated roller and the pressure roller are not any different and may even be more unfavourable. Since the latter has a circular shape, every serration will exert a jolt onto the pressure roller each time it passes over the two paper webs which are interposed between the two rollers in this zone. This will cause a change in the spacing from the center of the adjacent serrated roller in the rhythm of the tooth frequency. The magnitude of the variation in axial spacing corresponds to the arc height between the chord disposed above two adjacent teeth and the external diameter of the serrated roller. It is approximately twice as large as that between the two afore-mentioned serrated rollers and can approach almost 1/10 of a millimeter in the case of coarse toothing.

Even if the magnitude of the change in axial spacing between the pressure roller and serrated roller and between two serrated rollers is small, the dynamic forces which occur are very considerably due to the high frequency which can approach a magnitude of 800 Hz and due to the large masses of the rollers (about 1000 kg per roller). High pressures must be used for this reason alone in order to maintain permanent contact on both sides on the paper passing therethrough and in order to ensure clean impressions and glueing. When the pressures can no longer compensate sufficiently for the dynamic jolts which increase greatly at higher machine speeds, the result is a temporary raising of the rollers, poor impressions and glueing, as well as the feared "high-low" phenomenon in which only every other corrugation has a good impression and is correctly glued. Moreover, the periodical variations in axial spacing are a principal cause of the loud machine noise in the case of single face corrugating machines.

SUMMARY OF THE INVENTION

The object of the present invention is to avoid the periodic changes in axial spacing without impairing in any way the impression or glueing operation. There should be no contact between the flanks of the serration-like teeth, but rather the required, adequate flank clearance should be maintained. Moreover, the geometrical dimensions of the corrugated paper web and the single face corrugated cardboard formed from said corrugated paper web and the smooth cover web should not be varied at all or only insignificantly.

This object is accomplished in accordance with the invention in that the contour of the tooth root of at least one serrated roller is designed as a concave curve which is formed by rolling the tooth tip of the mating roller which is imagined to be enlarged by the thickness of the paper web, when both serrated rollers rotate in opposite directions with a constant axial spacing and that the pressure roller has longitudinal serrations parallel to the roller axis whose contours are rolling curves of the tooth tip of the second serrated roller co-operating with said pressure roller, said tooth tip being enlarged by the sum of the thicknesses of said corrugated paper web and said cover web to be glued. The result is the following advantages:

a. clean, uniform impressions without "high-low" phenomena;

b. reliable glueing of the cover web to each corrugation;

c. a higher production speed of the corrugating machine;

d. lower impression pressures and thus more favourable roller dimensions;

e. longer service life of the serrated rollers and the pressure roller;

f. a consideration reduction in the operating noise.

According to another feature of the invention, the pitch circle of the one serrated roller is located in the area of its tooth tips and the pitch circle of the other serrated roller is located in the area of its tooth roots, thereby advantageously producing rolling curves on both serrated rollers which are useful in practice.

According to another feature of the invention, the root contour of the one serrated roller is an equidistant to an elongated epicycloid and the root contour of the other serrated roller is an equidistant to a shortened epicycloid. The result is advantageous in that circular tooth tips mesh cleanly with the corrugated web of paper in the serration troughs formed as rolling curves with sufficient overlapping without pinching the paper between the flanks of the serrations.

According to another feature of the invention, the pitch circles of the pressure roller and the serrated roller co-operating therewith can be displaced out of the rolling zone. The result is again the advantage of producing useful rolling curves for the pressure roller and the co-operating serrated roller.

In a further development of the invention, the pitch circles are displaced toward the axis of rotation of the serrated roller. This advantageously results in a lower circumferential speed of the pressure roller periphery as compared to the circumferential speed of the external diameter of the serrated roller co-operating with it.

In yet another further development of the invention, for example, it is also possible for the pitch circles to be displaced toward the axis of rotation of the pressure roller. In this case a higher circumferential speed of the pressure roller periphery is achieved as compared to the circumferential speed of the external diameter of the serrated roller co-operating with it.

According to another feature of the invention, the serration contour in the pressure roller can be an equidistant to an elongated or shortened epicycloid with an arc-shaped tooth tip of the serrated roller co-operating with said pressure roller.

In yet another further development, it is possible for every tooth tip of the serrated roller to be designed not with a circular contour (convex curve with a constant radius of curvature), but rather according to a convex curve with a radius of curvature changing continuously to the right and left of the peak line, the radius of curvature being located above a minimum value determined by the strength of the paper web to be corrugated and flank angles between approx. 20° and 40° resulting for the corrugated paper web from the convex tip shape on the basis of a predetermined space and profile height. This possibility creates a practical embodiment of the invention.

According to yet another feature of the invention, the two pitch circles on which the serrated rollers theoretically roll on one another, can be chosen relative to the serrated external diameter of the rollers such that overlaps in engagement result in the area of the respective tooth tip/tooth root zone whose sum is equal to at least one whole tooth space, it being possible at the same time to direct the impression forces from the tip of the serration-like tooth across the paper web into the rolling curve of the mating roller.

In another further development of the invention, it is possible to choose the pitch circles on which the serrated roller and the pressure roller theoretically roll on one another relative to the external diameters of both rollers such that there is an overlapping in engagement over at least one whole tooth space in the area of the pressure roller serrations.

BRIEF DESCRIPTION OF THE DRAWINGS

The invention will now be described in detail in the following with reference to the embodiment illustrated in the drawing, in which.

DESCRIPTION OF THE PREFERRED EMBODIMENT

Figure 1:
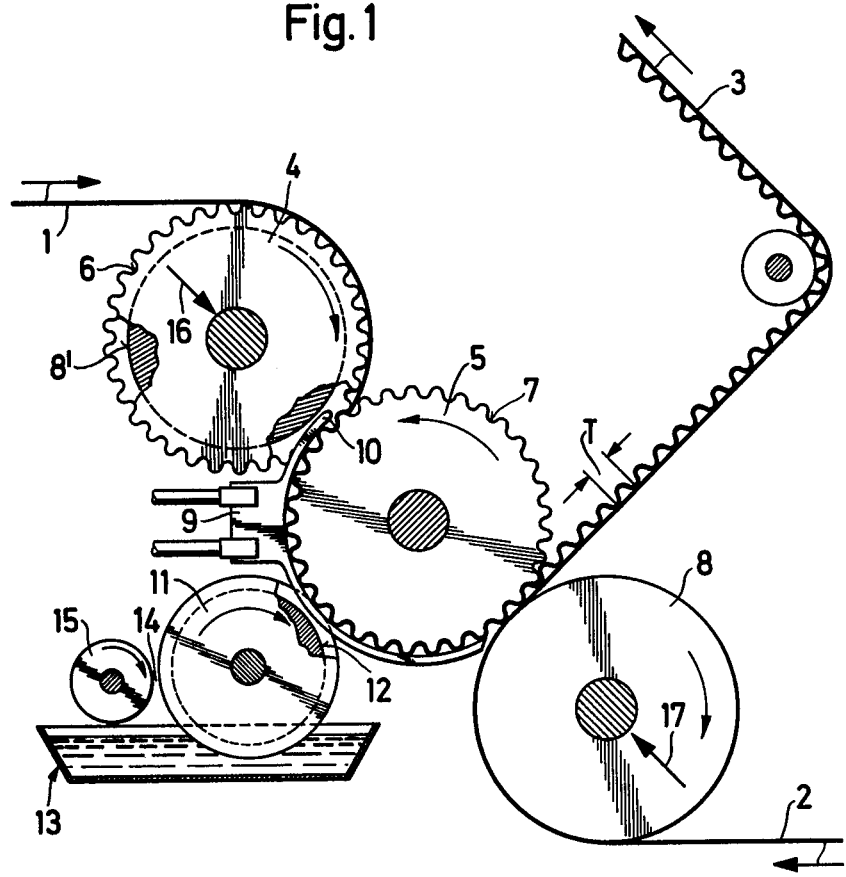
FIG. 1 is a schematic side elevation of a single face corrugating machine.

FIG. 1 illustrates in schematic form a single face corrugating machine. A paper web 1 is corrugated between two counter-rotating, heated serrated rollers 4 and 5 whch are pressed together along the pitch line. Before being fed into the corrugating machine, the web 1 to be corrugated is normally rendered pliant for the impression by pre-heating and spraying it with low-pressure steam, whereas the smooth paper web 2 to be glued onto said paper web is heated as it passes over a pre-heating cylinder.

The serrated rollers 4 and 5 have serrations 6 and 7 parallel to the roller axis corresponding to the desired corrugation shape of the paper 1 to be corrugated. Lugs 10 of sickel-shaped stationary guide plates 9 engage the annular serrations 8' of the first serrated roller 4. The annular serrations enclose in a semi-circular shape the second serrated roller 5 not provided with annular serrations on the side of the paper discharge from the impressing zone in an area of about 180° in a spaced relation somewhat larger than the thickness of the paper. The lugs of the guide plates are designed to lift the corrugated paper 1 out of the serrations of the first serrated roller 4 after impression which are then held in the serrations of the roller 5 by the inner contour of the guide plates facing the second serrated roller 5.

Approximately 90° after the impression zone, i.e. in the area of mutual co-operation of rollers 4 and 5, glue is applied by means of a rotating glue application roller 11 to the tops of the corrugations in the corrugated paper 1 which is held in position in the serrations of the second serrated roller 5 by the guide plates. At the sites where the guide plates are located, this roller 11 is provided with concentric annular serrations 12, thereby permitting the roller shell thereof with its segments bearing the glue film located between the guide plates to be brought close enough to the second serrated roller 5 so that the glue is transferred to the outer tops of the corrugations of the corrugated paper 1. The circumferential speed of the glue application roller 11 is approximately equal to the circumferential speed of the second serrated roller 5 and directed in the same direction. The glue film on the glue application roller has a constant thickness due to the fact that any excess glue from the glue pan 13 is squeezed off in an adjustable gap 14 relative to a squeegee 15 co-operating with the glue application roller or relative to a wiper blade (not shown in detail).

Approximately 180° after the impression zone, i.e. opposite the first serrated roller 4, the smooth paper web 2 is pressed against the glued corrugation tops of the corrugated web located in the serrationns of the second serrated roller 5 by means of a so-called pressure roller 8 with a smooth surface, thereby glueing the two together.

The spacing T of the single face corrugated cardboard 3 is thus determined in the glueing zone. It corresponds to the spacing of the serrations 7 on the second serrated roller 5 measured on the external diameter thereof.

As has already been stated, the serrated roller 4 has a large number of concentric annular serrations 8' which are normally spaced equidistantly from one another, which are distributed over the entire length of the roller and which co-operate with the stationary guide plates 9, thereby lifting the corrugated paper out of the serrations of the first serrated roller 4 after impression. same diameter as the two serrated rollers 4 and 5, is heated just like these said rollers, normally by steam. This steam is conducted into the cavities of the hollow designed rollers 4, 5 and 8 through rotary ducts (not shown in detail). The condensate is removed from the rollers again through siphon pipes and rotary ducts.

At least one of the three rollers, i.e. the serrated roller 4 provided with annular serrations 8', usually together with the pressure 8 as well, is designed with a convex or concave-vaulted shell surface which is calculated according to the impression pressures exerted such that constant line pressures are ensured over the entire width of the paper web.

The axes of the two serrated rollers 4 and 5 and of the pressure roller 8 are disposed advantageously in a plane inclined at approx. 45°. The glue application unit is located obliquely below the second serrated roller 5 which is termed the lower serrated roller.

The first serrated roller 4 is designed the upper serrated roller. The serrated roller 5 co-operating with the pressure roller 8 as well as the pressure roller 8 itself are driven at a speed corresponding to the desired production speed. The pressure roller 8 has a slightly lower circumferential speed as compared to the serrated roller 5 (lag) so that the paper web 2 is always taut.

The upper serrated roller, serrated roller 4, has no drive means, but is carried along during the impression process while meshing with the serrated roller 5. The rollers are pressed against each other in the direction of the arrows 16 and 17 (FIG. 1) usually by means of hydraulic cylinders which engage on bearing levers on both sides in which the bearings of these rollers are accommodated and which themselves are pivotally mounted in the stationary machine frameworks. Driven rollers also include the glue application rollers 11 and the squeegee roller 15.

Figure 2:
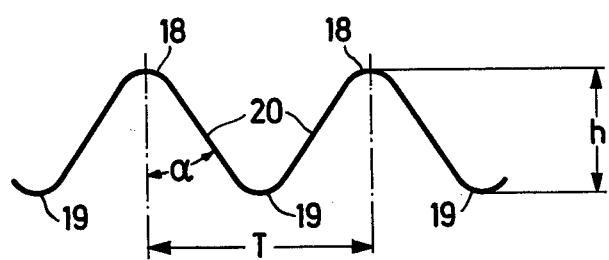
FIG. 2 is a section of a corrugated paper web.

According to FIG. 2, the spacing T of the serration 7 of the lower serrated roller 5 measured on the external diameter thereof, corresponds to the spacing of the corrugated web and thus to the spacing of the single face corrugated cardboard 3 after it is fixed in the glueing zone by glueing it to the smooth web 2. The corrugated web contour illustrated in FIG. 2 shows that for a given spacing T and profile height h the flanks 20 are steeper and the flank angles α smaller the broader the curved corrugation segments 18 and 19 are chosen to be. In practice, the limits for α are defined by the fact that a "latticework" with the best possible stability is to be formed using the smallest possible amount of stretched paper length.

It has been found that good, stable corrugated cardboards can be produced using flank angles α between approx. 20° and 40° with a favourable paper consumption at the same time.

Figure 3:
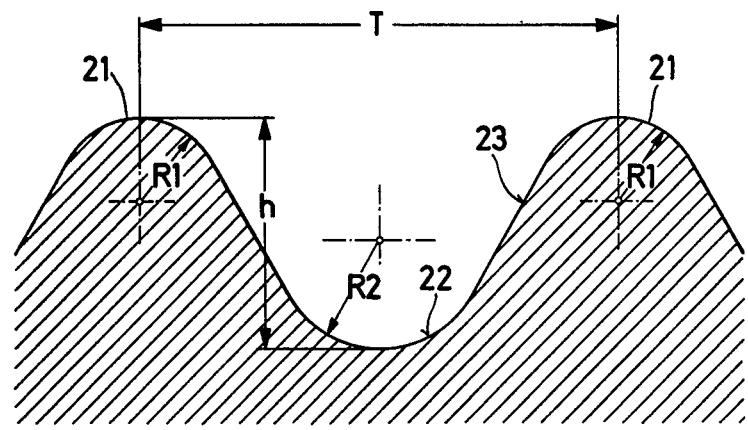
FIG. 3 is the serration-like tooth tip and root on a serrated roller.

The serration profile of conventional serrated rollers is composed of circles and straight lines according to FIG. 3 which shows a greatly enlarged cross section through a serration-type tooth of the lower serrated roller 5. The serration tips 21 are designed with a radius R1 which is somewhat smaller than the trough radius R2 of the tooth roots 22. The tooth flanks 23 follow the tip and root radius in a straight line and tangentially.

The serration 6 of the upper serrated roller 4 is exactly identical to the conventional design of the serration 7 of the lower serrated roller 5 with respect to the profile dimensions — they are normally produced using the same tool. The profile dimensions have the same construction even if the rollers do not have the same dimensions — which sometimes occurs. They are then manufactured with a different number of serrations according to their diameter. Most of the time, however, roller diameters and serration numbers are selected to be equal in the case of both rollers so that if one tooth is damaged by a foreign body, complete damage is not sustained by both rollers.

Figure 4:
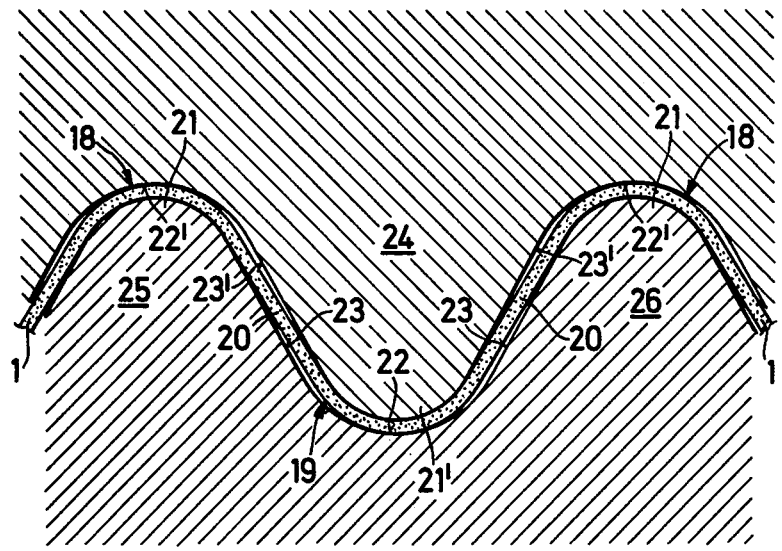
FIG. 4 is the geometric relationships between the tooth tip and the tooth root of two co-operating serrated rollers with a corrugated paper web interposed therebetween.

If, when impressing the paper in accordance with FIG. 4, the tip 21' of the serration tooth 24 of the one serrated roller presses the paper web 1 into the gap between two adjacent serration teeth 25 and 26 against the root 22 of the other serrated roller or the tip 21 of the second serrated roller against the root 22' of the first serrated roller, the paper is respectively pressed only between the serration tip 21, 21' of the one roller and the serration trough 22, 22' of the mating roller.

There is no pressure between the flanks due to the difference in radii between the root radius R2 and the tip radius R1 (FIG. 3). A certain amount of flank clearance exists. This flank clearance is necessary to corrugate a paper web in the single face corrugating machine. A squeeze in the flanks would inevitably lead to the destruction of the paper flanks. It would not be possible to achieve even fairly adequate production speeds and the manufactured cardboard would not have any resistance to crushing. The flank clearance gradually disappears with the natural wear of the serrated rollers which occurs substantially only at the tips and troughs subject to pressure. The set of rollers thus has to be interchanged.

Figure 5:
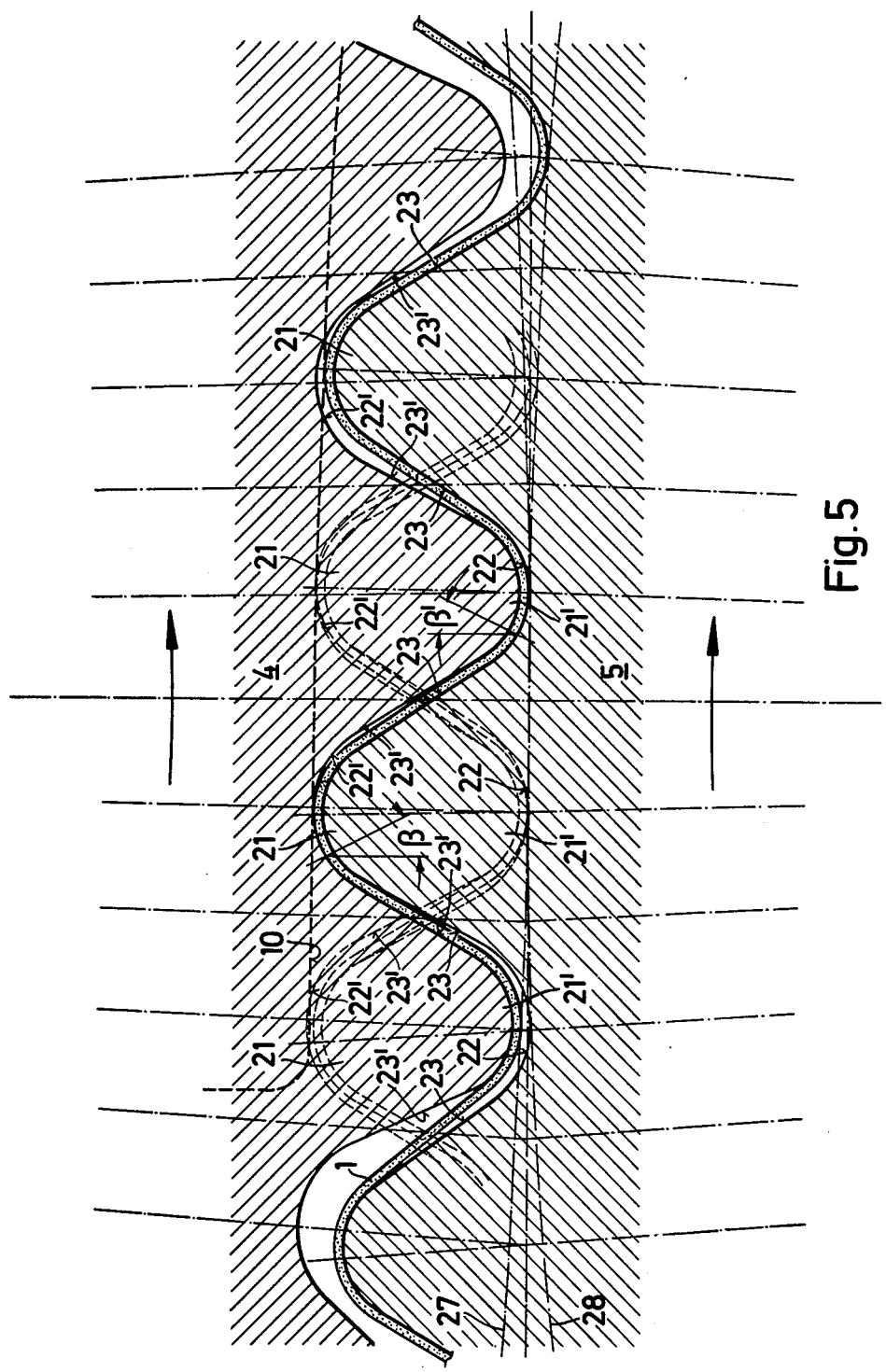
FIG. 5 is the design in accordance with the invention of the tooth tips and tooth roots of two serrated rollers with a paper web interposed therebetween.
Figure 6:
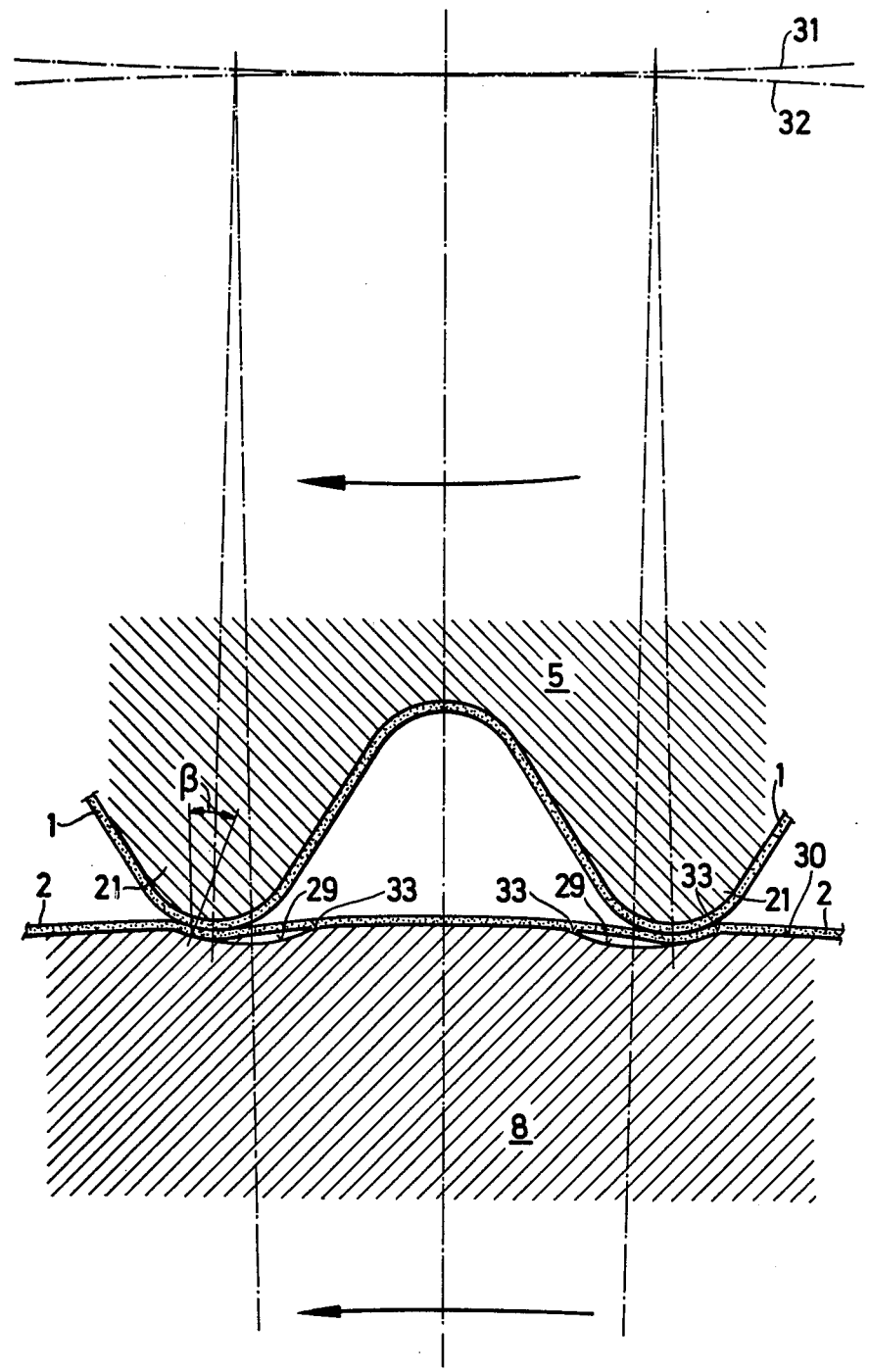
FIG. 6 is the design in accordance with the invention of the serrated roller and the pressure roller with the corrugated paper web and cover web interposed therebetween.

According to FIGS. 5 and 6, and in accordance with the invention, perfect rolling occurs in the restricted area between the tips and roots of the serrations of the two serrated rollers 4 and 5 and between the serration tips of the lower serrated roller 5 and the pressure roller 8 while including the interposed paper webs. This rolling is such that it in no way impairs the impression or glueing operations.

No contact or rolling is permitted between the flanks of the serration teeth and the required, adequate flank clearance is maintained there. In addition, the geometric dimensions of the corrugated paper web according to FIG. 2 and the single face corrugated cardboard 3 formed from this paper web and the smooth cover web 2 is not changed at all or only insignificantly.

The shape of the tooth tip 21 and/or 21', for example, can be changed such that, instead of one residue R1, another convex curve is selected with a radius of curvature which continuously varies by small amounts to the right and left of the peak. This radius of curvature, however, may not fall below a minimum value determined by the strength of the paper at any point.

In all cases, the trough radius R2 is replaced in at least one serrated roller 4 or 5 by a concave curve in order to accomplish the object in accordance with the invention. This concave curve results as a rolling curve of the tooth tip of the mating roller which is imagined as being enlarged by the thickness of the cardboard if both rollers are allowed to rotate against one another while maintaining a constant axial spacing. In the case of the pressure roller 8, the axial spacing constancy by rolling is achieved in that flat, longitudinal grooves or serrations parallel to the roller axis are formed in the circular surface thereof. The contour of these serrations again results as the rolling curve of the tooth tip of the second serrated roller 5 co-operating with said pressure roller. The tooth tip is again imagined as being enlarged by the sum of the thicknesses of the corrugated paper and the cover paper to be glued thereto.

The pitch circles on which the rollers theoretically roll on one another, as well as their external diameters and their circumferential speeds are selected accordingly so that practical, useful rolling curves are formed both in the serrated rollers 4 and 5 as well as in the pressure roller 8.

The next section is intended to explain the limits within which the contours of the teeth tips may be varied and the viewpoints under which the corresponding rolling curves can be regarded as useful. As has already been mentioned, good, stable corrugated cardboards are obtained with a simultaneous, favourable consumption of paper according to FIG. 2 with flank angles between 20° and 40°. Hence, the limits for the selectable tip shapes are thus determined. Furthermore, the radius of curvature of the tip curve R1 may at no point be smaller than a minimum radius determined by the strength of the corrugated webs. Still other factors, such as the production possibility, will also have to be taken into consideration when determining the shape of the serration-type tooth tip which can otherwise be freely chosen within the afore-cited limits.

Root curves in the serrated rollers 4 and 5 which are formed as rolling curves of the selected tooth heads must comply with the following conditions if they are to be regarded as useful:

The impression force must be able to be conveyed in every phase of the rotary angle from the tooth tip across the paper in a favourable transfer angle into the rolling curve of the mating roller.

The transfer angles $\beta$ and $\beta'$ are defined as being the angle between the straight connecting lines from the respective center of the roller to the momentary point of contact and the perpendicular at this point of contact (cf. FIG. 5 and 6). The transfer angle $\beta$ is zero when a tooth tip points exactly toward the center of the mating roller. The momentary point of contact is then located on the line connecting the two centers of said rollers. This phase position zero is repeated with each tooth.

After a rotation by one-half the serration spacing, the transfer angle is at its maximum respectively. Transfer angles up to a magnitude of 45° can be considered favourable. Engagement overlap must exist through at least one-half the serration spacing to the right and left of phase position zero — i.e. through a total of at least one complete serration spacing — since the desired axial spacing constancy is thus guaranteed.

In the case of the two serrated rollers 4 and 5, in which a serration of one roller engages the serration trough of the mating roller, the entire profile overlap can be subdivided into the engagement tip I — root II and tip II — root I, i.e. in a borderline case an engagement overlap would suffice covering $\pm \frac{1}{4}$ the serration spacing to the right and left of the peak point respectively, i.e. absolutely covering one-half the serration spacing. It must be guaranteed that the rolling in no case occurs up onto the flanks. If this should occur in certain combinations, the flanks of the serration-like teeth are intentionally machined until they are so hollow that the required flank clearance exists everywhere.

In the case of the rolling curves on the shell of the pressure roller 8 according to FIG. 6, only those curves are considered to be useful which produce the required engagement overlap with a serration depth of only a few 10ths of a millimeter because the cover web 2 to be glued is not deformed inadmissibly and the glueing process is not impaired by such flat serrations.

It has been found that in particular the right choice of the pitch circles on which the rollers 4, 5 and 8 theoretically roll on one another, have a decisive influence on the usefulness of the resultant rolling curves with respect to the external diameters of said rollers and thus with respect to their circumferential speeds, in particular if the circular arc shaped is retained for the contour of the serration tip. The result in this case, for example, is useful rolling curves for the two serrated rollers 4 and 5 when the pitch circle of the one roller is positioned in the area of its tooth tips and the pitch circle of the other roller in the area of the tooth roots.

An example for such serration toothing in accordance with the invention is illustrated in FIG. 5. The pitch circle 27 of the upper serrated roller 4 in this example coincides exactly with the external diameter thereof in addition to the paper thickness, and the pitch circle 28 of the lower serrated roller 5 coincides with the root diameter. In FIG. 5 in which two phase positions of the rolling motion which are offset by one-half the serration spacing are shown in the form of solid and dotted lines, and in which the same reference numerals are used for the individual segments of the serrated toothing as were used in FIGS. 3 and 4, it is evident that the tooth tips 21 and 21' shaped as circular arcs with the corrugated web 1 in the central part of the drawing, roll on one another in a clean manner in the serration troughs 22 and 22' formed as rolling curves with sufficient overlap without pinching the paper between the tooth flanks 23 and 23'.

The contour 22 of the tooth root of the lower serrated roller 5 is an equidistant to an elongated epicycloid in this case.

The contour 22' of the tooth root of the upper serrated roller 4 is an equidistant to a shortened epicycloid. The serration spacing measured on the external diameter of the upper serrated roller is somewhat smaller in this example than the serration spacing of the lower serrated roller 5 which is also measured on the external diameter. Accordingly, the circumferential speeds also differ somewhat, thereby favourably influencing the engagement overlap. FIG. 5 also reveals how the lugs 10 (indicated by the dotted line) of the guide plates 9 (FIG. 1) cause the corrugated web 1 to remain in the serration of the lower serrated roller 5.

According to FIG. 6, it is necessary for useful serration contours in the shell of the pressure roller 8 as rolling curves of the tooth tips of the lower serrated roller 5 in particular with a tip in a circular arc shape to move the pitch circles of the theoretical rolling process out of the rolling zone. This shift can be effected either toward the axis of rotaton of the lower serrated roller 5 or toward the axis of rotation of the pressure roller 8. In the first case, the result is a lower and in the latter case a greater circumferential speed of the pressure roller periphery as compared to the circumferential speed of the external diameter of the lower serrated roller 5. This has a favourable effect on the engagement overlap, in particular producing serrations of shallow depth.

According to FIG. 6 a corresponding relative movement occurs between the cover web 2 and the pressure roller periphery which does not affect the glueing process due to the corresponding braking effect of the cover web 2. The number of serrations 29 in the pressure roller 8 must be chosen to be smaller than, equal to or greaer than the number of serrations on the lower serrated roller 5, depending on the diameter ratio of the theoretical pitch circle 32 of the pressure roller 8 as compared to the theoretical pitch circle 31 of the lower serrated roller 5. The reverse is true for the speeds at which these rollers are to be driven.

FIG. 6, which illustrates an example of the design of the serrations 29 in the pressure roller 8 as rolling curves of the tooth tips of the lower serrated roller 5 imagined to be enlarged by the thicknesses of the corrugated and cover webs 1 and 2, again reveals the clean rolling conditions. The serration contour can also be determined for this example as an equidistant to an elongated epicycloid. Transitions with sharp edges between the serration contour 29 and the cylindrical part 30 of the pressure roller periphery are avoided by the use of transition radii 33.

If the tooth tip contour of the serrated rollers is designed not as a circle, but as another constantly convex curve, other diameter ratios of the pitch circles can be selected which are favourable for the design of the resultant rolling curves. Elliptical, parabolic or hyperbolic shapes as well as elongated or shortened hypocycloids or equidistants to the afore-stated types of curves are mentioned as examples of useful tip curves.

The hypocycloid-type tip shapes produced extended or shortened epicycloids as rolling curves for the mating rollers.

In any case, the present invention will thus advantageously accomplish the object of avoiding the periodic changes in spacing by effecting perfect rolling in the defined region between the serration tips and serration roots of the two serrated rollers 4 and 5 as well as between the serration tips of the lower serrated roller 5 and the pressure roller 8 while including the interposed paper webs 1 or 1 and 2, such rolling however being effected in such a manner that it in no way impairs the impression and glueing operations. No contact or rolling occurs between the flanks of the serration-type teeth. On the contrary, the required, adequate flank clearance is maintained there. Furthermore, the geometrical dimensions of the corrugated paper web 1 and the single face corrugated cardboard 3 formed of said corrugated paper web and the smooth cover web 2 are not changed at all or only insignificantly.

What is claimed is:

1. A machine for corrugating a single face of a paper web, said machine comprising, a first serrated roller and a second serrated roller positioned for cooperative engagement therebetween, a pressure roller positioned for cooperation with said second serrated roller, each said serrated roller having serration-type teeth with tooth tips and tooth roots, a paper web to be corrugated adapted to be fed between said serrated rollers under mutual pressure exerted upon said web, a cover paper web adapted to be supplied and glued to the corrugated paper web between said second serrated roller and said pressure roller, the tooth root contour of said second serrated roller being of generally concave curve configuration and formed by rolling the tooth tip of the first serrated roller against the second serrated roller with said paper web between said rollers, said serrated rollers being rotatable in opposite directions and having constant axial spacing, said pressure roller having longitudinal serrations formed parallel to the axis of said pressure roller, the contours of said longitudinal serrations being rolling curves and formed by rolling the tooth tip of said second serrated roller against the pressure roller with said corrugated paper web and cover web between said last named rollers.

2. A machine as claimed in claim 1 in which each tooth tip of said first and second serrated rollers is formed of generally convex curve configuration with a constant radius of curvature.

3. A machine as claimed in claim 1 in which each said serrated roller moves with respect to the other according to respective pitch circles, said pitch circles being such that engagement overlaps of said rollers are present in the area of the respective tooth tip and tooth root zone whose sum is equal to at least one whole tooth spacing, and that at the same time impression forces are transferred from the serration-type tooth tips across the paper web into the rolling curve of the mating roller.

4. A machine as claimed in claim 1 in which each said serrated roller moves with respect to the other according to respective pitch circles, the pitch circle of said first serrated roller being located in the area of its tooth tips and the pitch circle of said second serrated roller being located in the area of its tooth roots.

5. A machine as claimed in claim 1 in which said tooth tip contour is of generally arc-shaped configuration, the tooth root contour of said first serrated roller being an equidistant of an elongated epicycloid and the tooth root contour of said second serrated roller being an equidistant of a shortened epicycloid.

6. A machine as claimed in claim 1 in which said second serrated roller and said pressure roller move with respect to each other according to respective pitch circles, the pitch circles of the pressure roller and the serrated roller cooperating therewith being displaced out of the rolling zone of said rollers.

7. A machine as claimed in claim 1 in which each said serrated roller moves with respect to the other according to respective pitch circles, said pitch circles being displaced toward the axis of rotation of said second serrated roller.

8. A machine as claimed in claim 1 in which each said serrated roller moves with respect to the other according to respective pitch circles, said pitch circles being displaced toward the axis of rotation of said pressure roller.

9. A machine as claimed in claim 1 in which said second serrated roller and said pressure roller move with respect to each other according to respective pitch circles, the pitch circles relative to the external diameters of said rollers being such that there is an engagement overlap over at least one whole tooth spacing in the area of the pressure roller serrations.

10. A machine as claimed in claim 1 in which the tip profile of said second serrated roller is of generally arc-shaped configuration, the serration contour of the pressure roller being an equidistant of an elongated epicycloid with the arc-shaped tip profile of said second serrated roller cooperating with said pressure roller.

11. A machine as claimed in claim 1 in which the tip profile of said second serrated roller is of generally arc-shaped configuration, the serration contour of the pressure roller being an equidistant of a shortened epicycloid with the arc-shaped tip profile of said second serrated roller cooperating with said pressure roller.

12. A machine as claimed in claim 11 in which each tooth tip of said first and second serrated rollers is formed of generally convex curve configuration with a radius of curvature which varies continuously to the right and left of the peak line of the curve, the radius of curvature being greater than a minimum value determined by the strength of said paper web to be corrugated and flank angles of between approximately 20° and 40° for the corrugated paper web resulting from the convex tip shape with a predetermined spacing and profile height.

13. A machine as claimed in claim 12 in which said convex curve is an elliptical arc.

14. A machine as claimed in claim 12 in which said convex curve is a parabolic arc.

15. A machine as claimed in claim 12 in which said convex curve is a hyperbolic arc.

16. A machine as claimed in claim 12 in which said convex curve is an elongated hypocycloid.

17. A machine as claimed in claim 12 in which said convex curve is a shortened hypocycloid.

* * * * *